US008995911B2

(12) United States Patent
Nousiainen

(10) Patent No.: US 8,995,911 B2
(45) Date of Patent: Mar. 31, 2015

(54) APPARATUS AND ASSOCIATED METHODS

(71) Applicant: Nokia Technologies Oy, Espoo (FI)

(72) Inventor: Esa Nousiainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 131 days.

(21) Appl. No.: 13/722,446

(22) Filed: Dec. 20, 2012

(65) Prior Publication Data

US 2014/0179227 A1 Jun. 26, 2014

(51) Int. Cl.
| | |
|---|---|
| *H04B 5/00* | (2006.01) |
| *H04W 84/18* | (2009.01) |
| *G06Q 10/10* | (2012.01) |
| *G06Q 50/00* | (2012.01) |
| *H04W 4/00* | (2009.01) |
| *H04W 4/02* | (2009.01) |

(52) U.S. Cl.
CPC .............. *H04W 84/18* (2013.01); *H04W 4/008* (2013.01); *H04W 4/023* (2013.01); *G06Q 10/10* (2013.01); *G06Q 50/01* (2013.01); *H04W 4/02* (2013.01)
USPC ...... 455/41.1; 455/41.2; 455/41.3; 455/412.2

(58) Field of Classification Search
CPC ....... H04W 4/008; H04W 4/02; H04W 4/021; H04W 4/022; H04W 4/023; H04W 4/025
USPC ........... 455/41.1, 41.2, 41.3, 410, 411, 414.1, 455/414.2, 456.1, 456.3
See application file for complete search history.

(56) References Cited

U.S. PATENT DOCUMENTS

| | | | | |
|---|---|---|---|---|
| 7,202,814 | B2 * | 4/2007 | Caspi et al. | 342/357.35 |
| 7,606,580 | B2 * | 10/2009 | Granito et al. | 455/456.1 |
| 8,634,858 | B1 * | 1/2014 | Jackson | 455/456.3 |
| 2002/0147777 | A1 * | 10/2002 | Hackbarth et al. | 709/205 |
| 2002/0184089 | A1 * | 12/2002 | Tsou et al. | 705/14 |
| 2004/0198398 | A1 * | 10/2004 | Amir et al. | 455/456.6 |
| 2006/0143298 | A1 | 6/2006 | Anttila et al. | |
| 2006/0167991 | A1 * | 7/2006 | Heikes et al. | 709/204 |
| 2010/0041332 | A1 * | 2/2010 | Flygh et al. | 455/41.1 |
| 2011/0106898 | A1 * | 5/2011 | Granito et al. | 709/206 |
| 2011/0230209 | A1 | 9/2011 | Kilian | |
| 2011/0258689 | A1 * | 10/2011 | Cohen et al. | 726/7 |
| 2011/0293095 | A1 * | 12/2011 | Ben Ayed | 380/270 |
| 2012/0071087 | A1 * | 3/2012 | Griffin et al. | 455/41.1 |

FOREIGN PATENT DOCUMENTS

| | | |
|---|---|---|
| EP | 2 432 201 A1 | 3/2012 |
| WO | WO 2009/146250 A1 | 12/2009 |
| WO | WO 2010/018468 A1 | 2/2010 |

OTHER PUBLICATIONS

International Search Report and Written Opinion for Application No. PCT/FI2013/051026 dated Feb. 13, 2014.

\* cited by examiner

*Primary Examiner* — Duc M Nguyen
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: when the determined relative position of a first portable electronic device with respect to at least a second electronic apparatus is within a predetermined proximity, automatically provide for an availability status update, associated with a user of the first portable electronic device, for use by a third party electronic device.

19 Claims, 7 Drawing Sheets

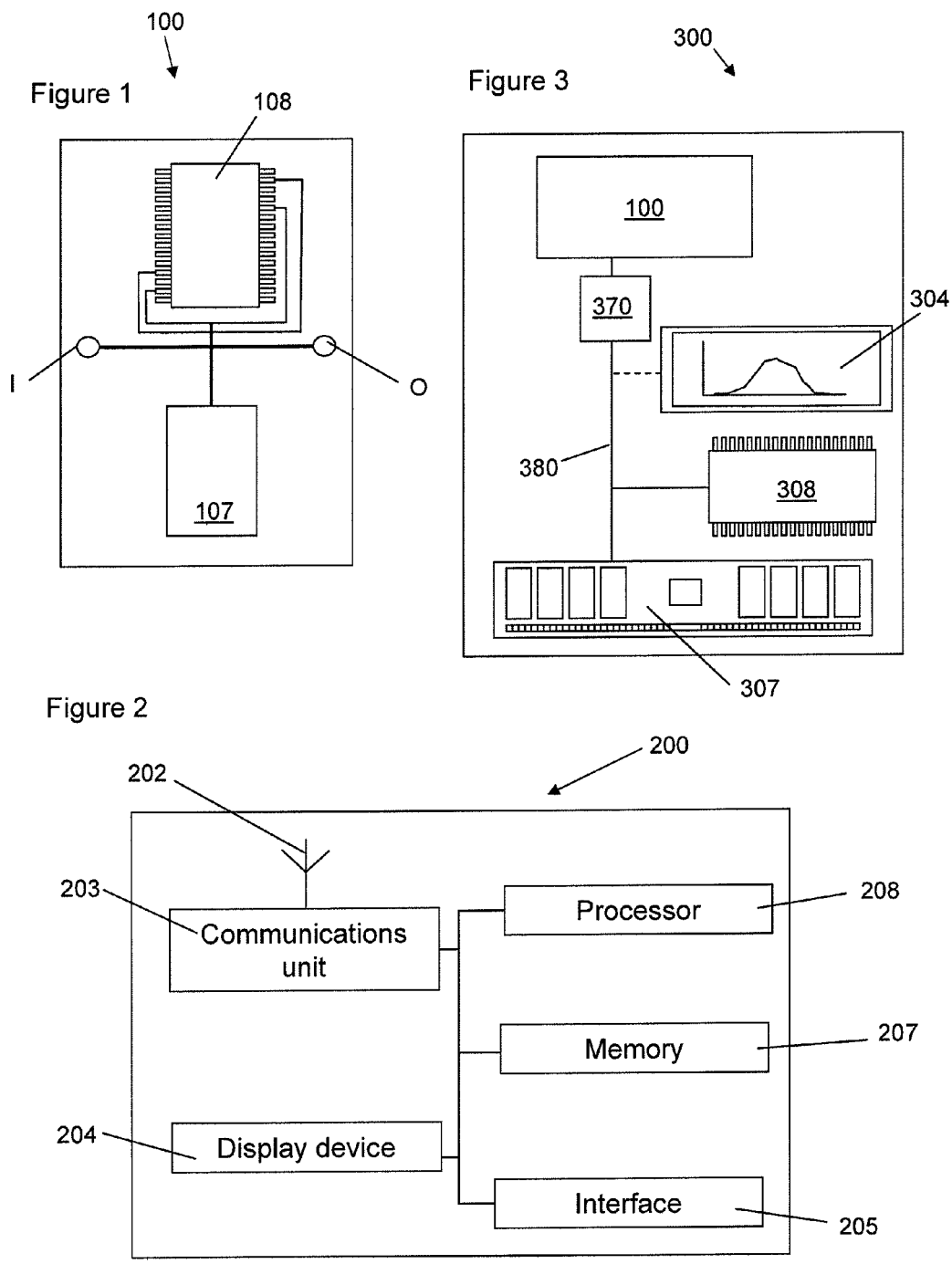

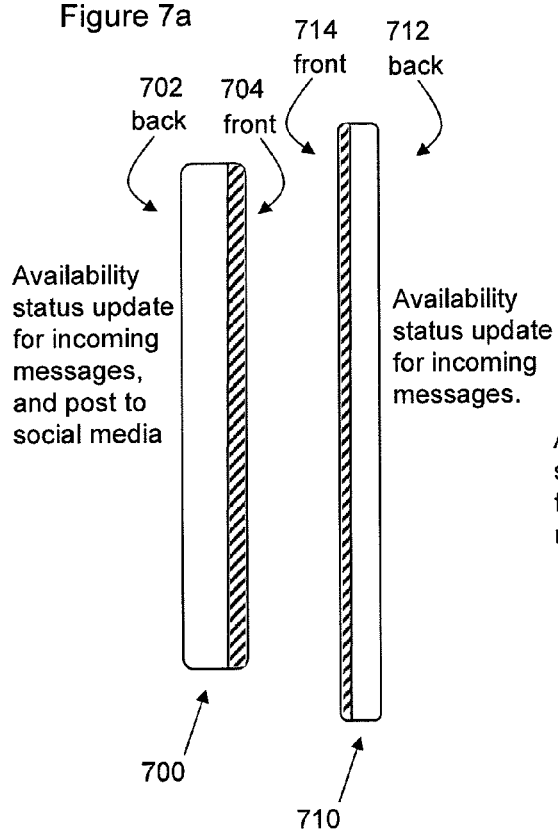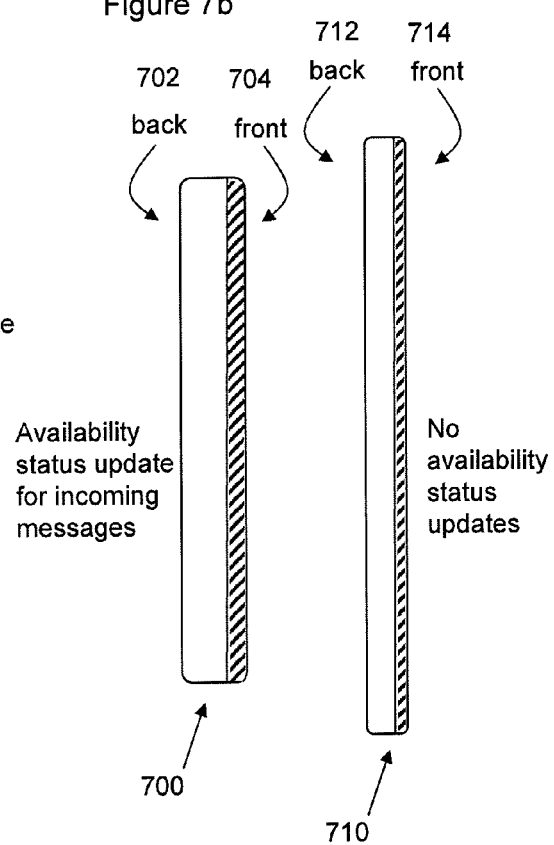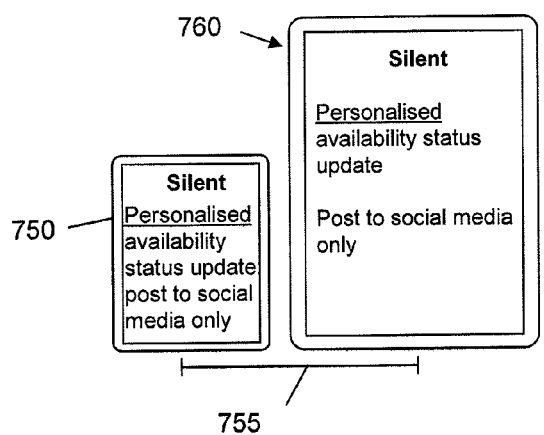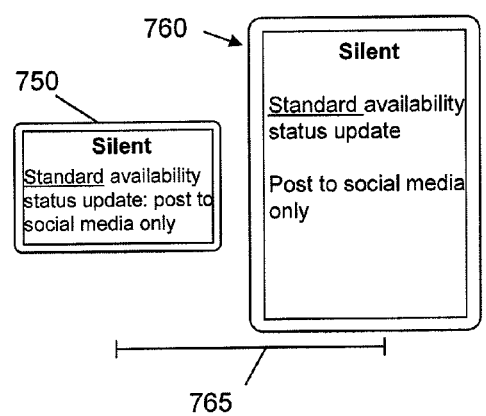

Figure 9a
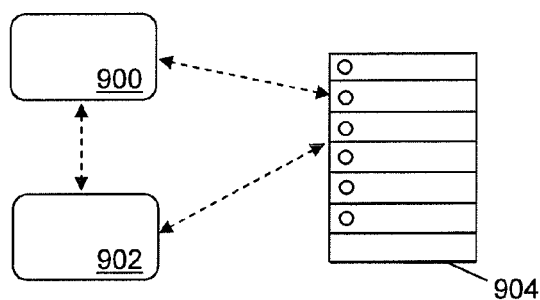
Figure 9b
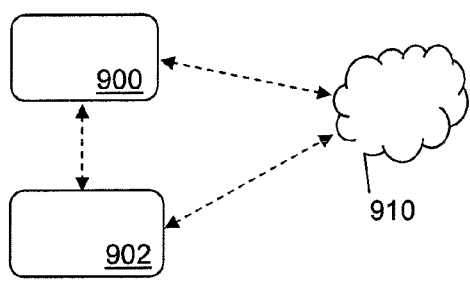
Figure 10
Automatically providing for an availability status update associated with a user of a first portable electronic device, for use by a third party electronic device, when the determined relative position of the first portable electronic device with respect to at least a second electronic apparatus is within a predetermined proximity. ⎯1000
Figure 11
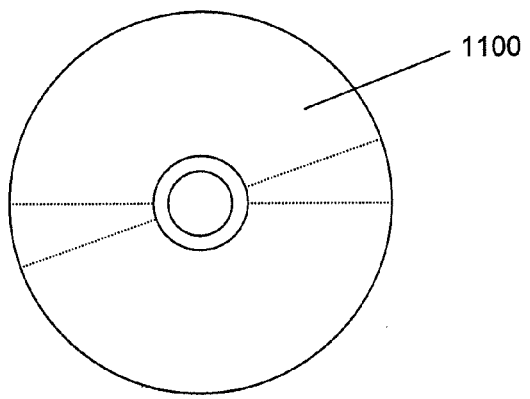

APPARATUS AND ASSOCIATED METHODS

TECHNICAL FIELD

The present disclosure relates to personal electronic devices, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

A user may have an electronic device which allows the user to be contactable by, for example, telephone, e-mail, SMS/MMS messaging, and social media. The electronic device may alert the user that a communication has been received or is being received, for example by displaying an icon, sounding a beep/tone, sounding a ringtone, illuminating a display and/or an indicator light, and/or vibrating.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first example aspect there is provided an apparatus, the apparatus comprising at least one processor, and at least one memory including computer program code, the at least one memory and the computer program code configured, with the at least one processor, to cause the apparatus to perform at least the following: when the determined relative position of a first portable electronic device with respect to at least a second electronic apparatus is within a predetermined proximity, automatically provide for an availability status update, associated with a user of the first portable electronic device, for use by a third party electronic device.

For example, two friends go out to lunch and do not want to be disturbed by their smartphone devices vibrating or flashing to indicate that a message/call has been received. They also want to let their friends know that they have gone out together. The first device belonging to one friend, and the second apparatus/device belonging to the other friends, are placed together on a table. The devices are determined to have relative positions with a predetermined proximity with respect to each other. Therefore due to the proximity, availability status updates are automatically provided in respect of/by the first device (and in some examples in respect of/by the second device). Such availability status updates may include a social media post to say that the two friends are together at a particular restaurant, and may include automatically responding to incoming communications, such as sending auto-replies to received text messages and e-mails, and setting up an answer machine message which a third party, using their device, automatically reaches if they call the first device. The two friends can enjoy their lunch without being unnecessarily disturbed by incoming calls and messages and their social media contacts can see what they are doing.

The predetermined proximity may be at least one of an overlying proximity in which at least a portion of the first portable electronic device overlies the second electronic apparatus, and a non-overlying proximity position. Thus one device may totally or partially overlie another device, or two devices may be placed side by side (in close proximity), for example. The different relative positions may be used by the two or more devices/apparatus. Different particular configurations may cause different availability status updates to be provided.

The predetermined proximity may be determined using one or more of a proximity sensor in the first electronic device or second electronic apparatus, a cellular network, and/or a wireless local area network. The predetermined proximity may be a position determined using Bluetooth and/or Near Field Communication (NFC), using a touch sensor, and/or a capacitive sensor configured to detect the presence of an object within a particular distance (for example, within 3 cm of the sensor). Thus the detection of another device in proximity to the first may be performed using different sensors and/or communication methods.

The second electronic apparatus may be one or more of: a charging plate for the first portable electronic device, and a portable electronic device of a second user or of the first user. Thus, for example, a user may place their first device onto the second apparatus as a charging device to charge the battery of the first device. As another example the first device and second apparatus may each be portable electronic devices such as smartphones or tablet computers. The first device may belong to a first user and the second apparatus/device may belong to a second user in some examples. In other examples, the first device and second apparatus/device may both belong to the same (first) user. For example, the user may have a smartphone (a first device) and a tablet computer (the second apparatus/device). In the case where the first device and one or more second devices belong to the same user, the availability status update may be provided once for the user rather than for each separate device.

When the at least a second electronic apparatus is a portable electronic device of a second user, or respective portable electronic devices of respective plurality of users, the availability status update may comprise particular details associated with the second user or respective one or more of the plurality of users. The particular details may comprise a name associated with the second or one or more of the respective plurality of users. Thus, the first and second devices may be in proximity, and the second device may be owned by a user called Will. An availability status update may be an automated e-mail reply from the first device to an e-mail received from a third party device stating "I'm busy with Will right now—I'll get in touch later". Will may have a social media microblog account with the username "william647" and an availability status update from the first device may be a social media microblog posting stating "I'm out at the moment with Will @william647" In this way an availability status update may be tailored to show who the user is with, for example so that the third party trying to contact the user of the first device knows that the user of the second device is also busy and therefore knows not to try and contact them either.

The "automatically provide for an availability status update" may comprise providing for generation of signalling for transmission to the third party electronic device with availability status details of the user of the first portable electronic device. Thus providing for the availability status update may be generating the update.

The "automatically provide for an availability status update" may comprise providing for transmission of generated signalling to the third party electronic device with availability status details of the user of the first portable electronic device. Thus providing for the availability status update may be transmitting the update for use by the third party.

The apparatus may be configured to, when the relative position is no longer determined to be within the predetermined proximity, automatically provide for one or more of: termination of the provision of the availability status update; and provision of an availability status update indicating the availability of the user of the first portable electronic device. Thus, for example, after a meeting, the participants will leave taking their devices with them. Their respective devices may switch from providing availability status updates to no longer providing availability status updates, and/or may provide a particular availability status update stating "I'm no longer busy in a meeting", for example (or delete/reset a previous availability status update). In this way, third parties are made aware in a timely fashion of when a user is likely to respond to their communications and when not to try and contact the user, as well as then the user of the first device is available.

The apparatus may be configured such that the automatic provision of the availability status update requires, prior to the automatic provision for use by the third party electronic device, one or more of: user confirmation; user selection of a particular predefined availability status update; prompting the user to create/write/record an availability status update; and prompting the user to initiate the provision of a first portable electronic device mode which provides for the provision of the availability status update. Thus a user may be provided with a prompt to allow their device to provide availability status updates, and in some examples to configure the particular availability status updates provided (for example, setting what communications types such as e-mail, telephone calls, and social media, availability status updates should be provided, the content of the availability status update, and to whom the updates may be sent). The availability status updates can thus be customised/controlled by a user.

The apparatus may be configured such that the automatic provision of the availability status update requires an incoming air interface communication to the first portable electronic device prior to the provision of the availability status update for the source of the incoming air interface communication. Such an incoming communication may be an e-mail, video call, telephone call, text message or MMS message, for example. The apparatus may be configured to provide a particular defined availability status update according to the particular source of the incoming air interface communication. The incoming air interface communication may be incoming to the first portable electronic device.

The availability status update may comprise one or more of: an unavailable and/or engaged dialing tone associated with the first portable electronic device; an unavailable and/or engaged text/audio/video/multimedia message indication associated with the user of the first portable electronic device; signalling to activate an answerphone associated with the user of the first portable electronic device; an answerphone message associated with the user of the first portable electronic device; and a posting for a social media application associated with the user of the first portable electronic device.

The apparatus may be configured to receive details of a user of the second electronic apparatus and provide those details in the availability status update for the user of the first portable electronic device. For example, an automatically generated e-mail availability status update may be provided from the first device which recites the name and an image/avatar of the user of the other device proximal to the first device. This information may be generated using appropriate details received from the second electronic apparatus.

The apparatus may be configured to receive details of a user of the second electronic apparatus and provide those details in the availability status update on behalf of the user of the second electronic apparatus. Thus, the apparatus may send the availability status update for the second electronic device.

The apparatus may be configured to provide for the availability status update based on whether the at least a second electronic apparatus is within a predefined group for the user of the first portable electronic device. For example, if the first device and the second apparatus/device are each used by users in the same defined social media group, family, or company, a personalised availability status update which includes the names of the two users may be provided to third parties in the same group, and a more generic availability status update group which does not include the names of the two users may be provided to third parties who are not in the same group.

The apparatus may be configured to provide a particular availability status update based on one or more of the particular determined proximity and relative positional proximity of the first portable electronic device and the second electronic apparatus. For example, if two devices are placed side by side, one particular type of availability status update (for example, a social media status update) may be provided. If the devices are stacked in a different relative positional proximity, with the front of one device located next to the back of another device, another particular type of availability status update may be provided such as an automatic message reply. If the devices are stacked face-to-face in a different relative positional proximity again, another particular type of availability status update may be provided, such as an automatic answer machine message for incoming calls.

The availability status update may be configured for use by a social media application available to the third party electronic device. For example, the detection of a proximal device may cause the first device to post a social media update such as "Just meeting with Joe Brown at the moment". A device used to view the social media update may be considered a third party electronic device.

The apparatus may be configured to automatically enter the first portable electronic device into a busy mode when the determined relative position is within the predetermined proximity position. The busy mode may provide for the availability status update. For example, the first device may enter a mode in which, for example, audio output is muted, vibration is not activated, and no visual indicators/prompts are displayed for a user upon a communication or update being receive from a third party device, for example.

The apparatus may be configured to determine if the relative position is within the predetermined proximity position. For example, the apparatus may comprise a proximity sensor, a touch sensitive sensor configured to detect another device in contact with it, a capacitive sensor configured to detect objects within a predefined distance from the sensor (e.g., within 3 cm), via Bluetooth, NFC, a wireless network (e.g., WLAN), or a combination of these.

The first portable electronic device may be a communications device configured to allow a user of the device to communicate with one or other communications devices using an air interface. For example, it may allow for internet (e.g., Wi-Fi, cellular) access and/or telephone calling.

The apparatus may be the first portable electronic device. If the first portable electronic device is a communications device, the apparatus may be the communications device, or a module or circuitry for the same. In other examples the apparatus may be a remote apparatus remote from the first device and second apparatus/device, or may in other examples form part of the second apparatus (or be the second apparatus).

The apparatus may be: an electronic device, a portable electronic device, a mobile phone, a smartphone, a tablet computer, a personal digital assistant, a graphics tablet, a charging apparatus, a digital camera, a navigator, a laptop computer, a server, a non-portable electronic device, a desktop computer, a monitor/display, or a module/circuitry for one or more of the same.

According to a further example aspect, there is provided a method, the method comprising automatically providing for an availability status update associated with a user of a first portable electronic device, for use by a third party electronic device, when the determined relative position of the first portable electronic device with respect to at least a second electronic apparatus is within a predetermined proximity.

According to a further example aspect, there is provided a computer program comprising computer program code, the computer program code being configured to perform at least the following: when the determined relative position of a first portable electronic device with respect to at least a second electronic apparatus is within a predetermined proximity, automatically provide for an availability status update, associated with a user of the first portable electronic device, for use by a third party electronic device.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product.

According to a further example aspect there is provided an apparatus comprising: means for automatically providing for an availability status update associated with a user of a first portable electronic device, for use by a third party electronic device, when the determined relative position of the first portable electronic device with respect to at least a second electronic apparatus is within a predetermined proximity.

According to a further example aspect there is provided an apparatus comprising at least one processor, and at least one memory including computer program code, the at least one memory and the computer program code configured to, with the at least one processor, cause the apparatus to perform at least the following: based on a determined proximity between a first portable electronic device and a second electronic apparatus, place the first portable electronic device and/or the second electronic apparatus into a functional privacy mode.

The first portable electronic device and/or the second electronic apparatus may automatically switch into a functional privacy mode upon being detected in a predetermined proximity with each other. For example, if a first portable electronic device is placed next to a second electronic apparatus, one or both devices may switch into the privacy mode due to the close proximity of one device to the other. Such a privacy mode may cause the device(s) to operate in silent mode (with or without vibration) and may cause, for example, an out-of-office notification to be enabled for e-mails and/or a text message to be sent to a group of contacts stating the user's of the first device and second apparatus are not available.

The present disclosure includes one or more corresponding aspects, embodiments or features in isolation or in various combinations whether or not specifically stated (including claimed) in that combination or in isolation. Corresponding means and corresponding function units (e.g. a position determined, a relative position determiner, an automatic status updater) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIG. 1 illustrates an example apparatus embodiment comprising a number of electronic components, including memory and a processor, according to one embodiment of the present disclosure;

FIG. 2 illustrates an example apparatus embodiment comprising a number of electronic components, including memory, a processor and a communication unit, according to another embodiment of the present disclosure;

FIG. 3 illustrates an example apparatus embodiment comprising a number of electronic components, including memory, a processor and a communication unit, according to another embodiment of the present disclosure;

FIGS. 7a-7d illustrate examples of a first portable electronic device and a second electronic apparatus/device in proximity with different relative positioning according to examples disclosed herein;

FIGS. 9a-9b illustrate an example apparatus in communication with a remote server/cloud, according to another embodiment of the present disclosure;

FIG. 10 illustrates a flowchart according to an example method of the present disclosure; and FIG. 11 illustrates schematically a computer readable medium providing a program.

DESCRIPTION OF EXAMPLE ASPECTS/EMBODIMENTS

Figure 4A:
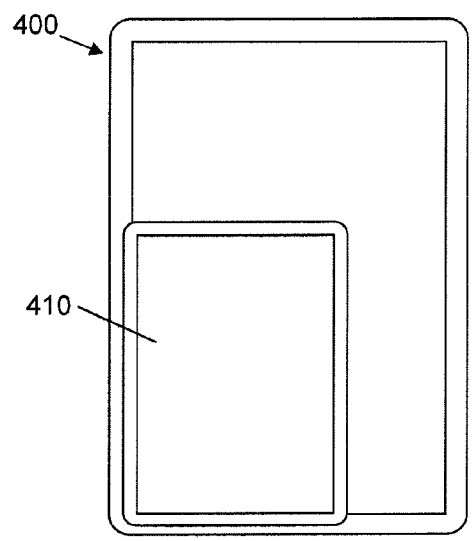
FIGS. 4a-4d illustrate examples of a first portable electronic device and one or more second electronic apparatus/devices in proximity according to examples disclosed herein.

An electronic device can be used for communication in different ways. For example, a smartphone can allow a user to be contacted by telephone call, video call, e-mail, SMS/MMS messaging, and social media. The user may feel connected to friends, family, business contacts and colleagues while their smartphone is switched on.

The electronic device may alert the user that a communication has been received or is being received. For example, if a telephone or video call is received, the device may sound a ringtone and vibrate. If a message, e-mail or social media update is received, the device may display an icon, sound a beep/tone, illuminate a display and/or an indicator light, and/ or vibrate. The user may feel that they are always available to be contacted unless their switch their device off.

If a user does not want to be contacted generally for a period of time they may switch their device off. However, this may not be ideal if the user still wants to be available for contact in an emergency, or if they wish to use the device for other tasks such as browsing the internet or reading a document or e-book, for example.

A user may be able to switch the device into a silent/muting mode so the user is not aware that someone is trying to contact them. However, a person trying to make contact with the user will not know why their communication has not been received/responded to. This may be frustrating for the user who feels that he/she is ignoring his/her contacts, and may be frustrating for the person trying to make contact with the user who will not know why his/her communication has been ignored.

It may be advantageous for a user to use a device which is easily and readily configurable so that the user is not distracted by the device making a sound, vibrating and/or flashing each time a communication is received by the device. It may also be advantageous for a user to feel that the person trying to contact them is not being ignored and for the person trying to contact the user to know why their communication has not been responded to. It may also be advantageous for a user who is with another person for both people to readily configure their devices so that they are not distracted by incoming communications, but that the person making the communication does not feel ignored.

Examples disclosed herein may be considered to provide a solution to one or more problems noted above. Disclosed herein is an apparatus configured to, when the determined relative position of a first portable electronic device with respect to at least a second electronic apparatus is within a predetermined proximity, automatically provide for an availability status update, associated with a user of the first portable electronic device, for use by a third party electronic device.

For example, a user is out to dinner with a friend. The user has a first portable electronic device, and the friend has a second apparatus/device. Each person can place their device (e.g., a smartphone) on the table so that the devices are together within a predetermined proximity. The two devices may be laid next to each other, or one device may be placed on top of the other, for example. Due to the proximity of the two devices, an availability status update may be automatically provided (which may require user confirmation and/or prompting of user action/input) which is associated with the user of the first device, and the update is for use by a third party electronic device. Thus a third party device making a telephone call to the first device may receive an answer machine message stating that the first user is busy (as the first device is in a predetermined proximity with the second apparatus such that an availability status update (the answer machine message) is provided to a third party caller). This allows the first and second users to enjoy dinner without being disturbed by telephone calls, knowing that the call will not be ignored because the answer machine is operating.

Other embodiments depicted in the figures have been provided with reference numerals that correspond to similar features of earlier described embodiments. For example, feature number 100 can also correspond to numbers 200, 300 etc. These numbered features may appear in the figures but may not have been directly referred to within the description of these particular embodiments. These have still been provided in the figures to aid understanding of the further embodiments, particularly in relation to the features of similar earlier described embodiments.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device.

The input I allows for receipt of signalling to the apparatus 100 from further components, such as components of a portable electronic device (like a touch-sensitive display) or the like. The output O allows for onward provision of signalling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208. The apparatus in certain embodiments could be an electronic device, a portable electronic device, a mobile phone, a Smartphone, a tablet computer, a personal digital assistant, a graphics tablet, a digital camera, a navigator, a laptop computer, a server, a non-portable electronic device, a desktop computer, a monitor/display, or a module/circuitry for one or more of the same.

The example embodiment of FIG. 2, in this case, comprises a display device 204 such as, for example, a liquid crystal display (LCD), e-Ink or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

FIG. 3 depicts a further example embodiment of an electronic device 300, such as a tablet personal computer, a portable electronic device, a portable telecommunications device, a server or a module for such a device, the device comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

FIGS. 4a-4d illustrate an example embodiment of a first portable electronic device 410 with a determined relative position with respect to at least one second electronic apparatus/device 400, 420 within a predetermined proximity.

Figure 4B:
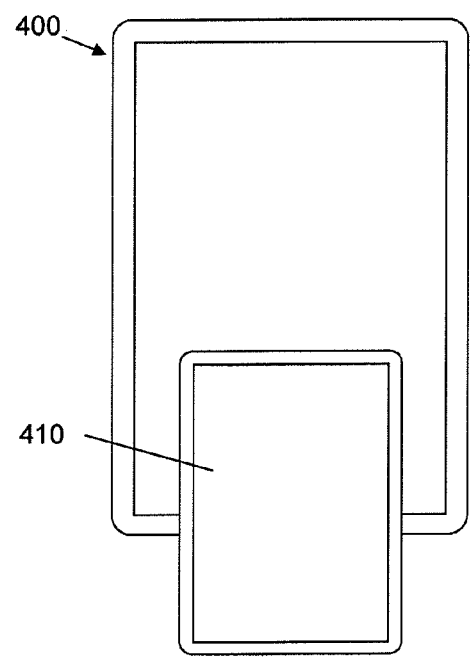
Figure 4C:
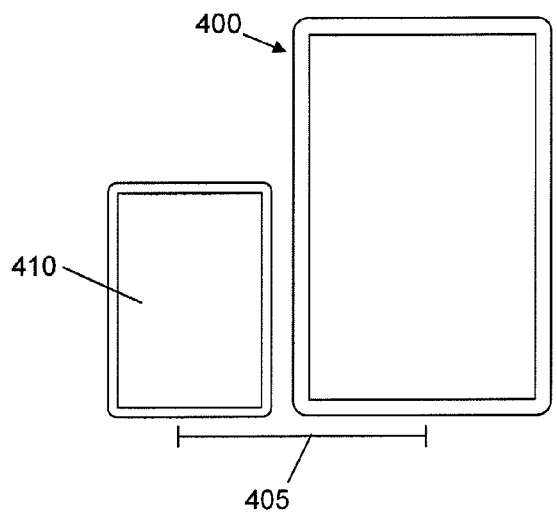
Figure 4D:
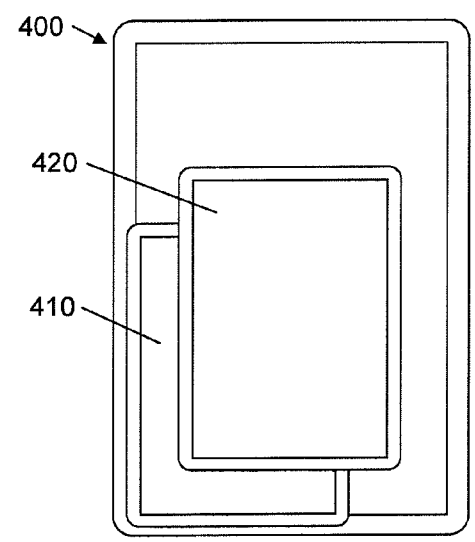

FIG. 4a shows the first portable electronic device 410 on top of the second electronic apparatus 400 so that the predetermined proximity is an overlying proximity in which all of the first device 410 overlies the second apparatus 400. FIG. 4b shows the first portable electronic device 410 partially on top of the second electronic apparatus 400 so that the predetermined proximity is an overlying proximity in which a portion of the first device 410 overlies the second apparatus 400. FIG. 4c shows the first portable electronic device 410 next to and not overlapping the second electronic apparatus 400 so that the predetermined proximity is a non-overlying proximity position. FIG. 4d shows the first portable electronic device 410 overlying the second electronic apparatus 400, and a further second electronic apparatus 420 partially overlying the first device 410 and completely overlying the second apparatus 400. The first portable electronic device, second electronic apparatus, and any further device/apparatus, may be positioned relative to each other in any combination of proximal positions such as those illustrated in FIGS. 4a-4d.

In a configuration such as those illustrated in FIG. 4a-4d, the apparatus is configured to automatically provide for an availability status update, associated with a user of the first portable electronic device, for use by a third party electronic device. The apparatus may be the first portable electronic device, a module for the first portable electronic device, or a remote element such as a server or module for a server with which the first portable electronic device and/or second electronic apparatus is in communication.

In certain examples, the way in which one particular device/apparatus is positioned with respect to another apparatus/device may determine the types of availability status update provided for use by a third party electronic device. For example, a complete overlap configuration such as that shown in FIG. 4a may provide for a social media status update, and automatic text message and e-mail responses to be sent, whereas a partial overlap such as that shown in FIG. 4b may provide for social media status updates but not auto-replies to received messages.

Figure 5A:
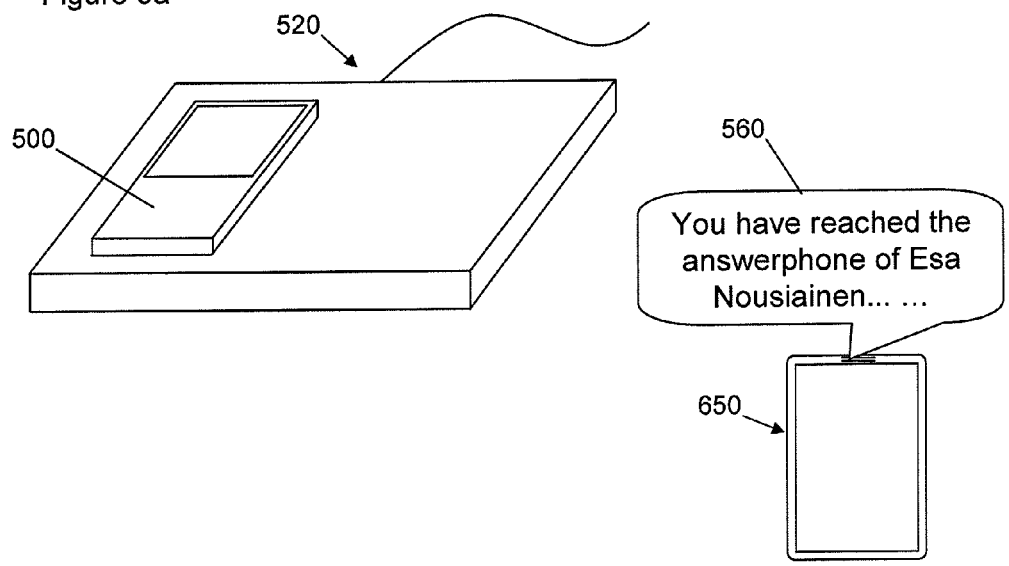
FIGS. 5a-5b illustrate examples of a first portable electronic device and a second apparatus, which is a charging plate, in proximity according to examples disclosed herein.
Figure 5B:
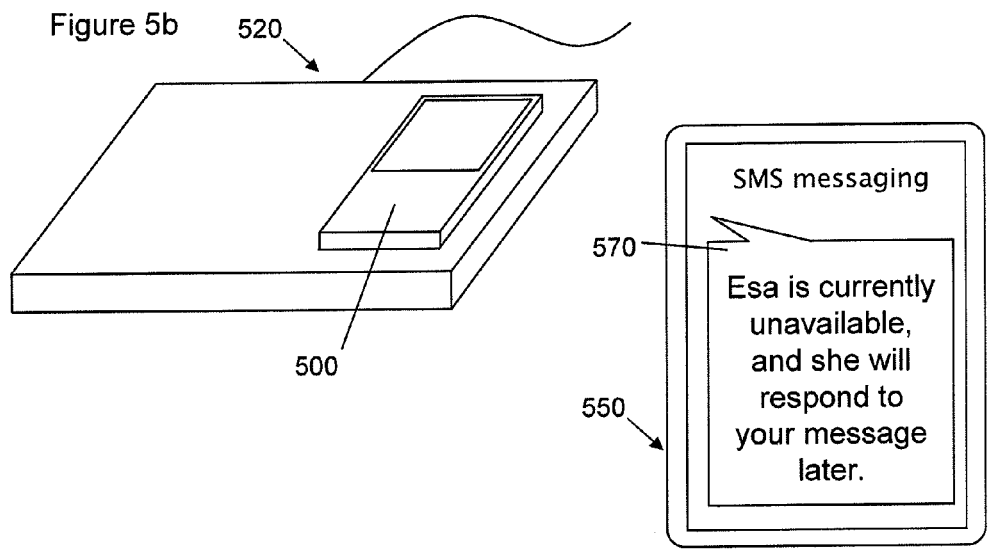

FIGS. 5a-5b illustrate examples wherein the first portable electronic device 500 is a device such as a mobile telephone, smartphone, personal organiser, or tablet computer, for example. In this example the first device 500 belongs to a user called Esa Nousiainen. The second electronic apparatus 520 is a charging plate. The first device 500 may be placed on the charging plate 520 and the charging plate 520 wirelessly charges the internal battery of the first device 500. The user does not want to use the first device 500 while it is charging. This example demonstrates that different determined relative positions of the first device 500 with respect to the second apparatus 520 may give rise to the automatic provision of different availability status updates.

In FIG. 5a, the first device 500 is placed towards the left on the charging plate 520 for charging. This determined relative proximal position causes the apparatus to automatically provide an availability status update by answer machine in the event of a third party electronic device 550 calling the first device 500. Thus, if a third party device 550 calls the first device 500, the third party device 550 will automatically receive the answer machine message 560 "You have reached the answerphone of Esa Nousiainen".

In other examples, if the user of the first device does not want to receive any recorded messages, rather than an answer machine message being played for the third party device, an engaged or unavailable dial tone may be played for the third party device. In certain examples, the apparatus may be able to determine the source of the incoming call, and based on the incoming source, provide an answer machine message or an unavailable dial tone. For example, an incoming call identified as from a family member, friend or business colleague may cause an answer machine message to be played and allow the caller to leave a message, whereas an incoming call from an unknown number (which may be from, a cold caller for example) would receive an unavailable dial tone and the caller would not be able to leave a message.

In FIG. 5b, the first device 500 is placed to the right on the charging plate 520 for charging. This determined relative proximal position causes the apparatus to automatically provide an availability status update by text message 570 in the event of a third party electronic device 550 sending a text message to the first device 500. (In other examples, a text message 570 may be sent upon the first device receiving any type of air-interface communication from a third party device 550 such as a telephone call or e-mail). Thus, if a third party device 550 sends a text message to the first device 500, the third party device 550 will automatically receive the text message 570 "Esa is currently unavailable, and she will respond to your message later".

In the abovementioned examples, the content of the automated replies (e.g., e-mails, answer machine messages, text messages, social media status updates, and microblog entries) may be user specified. The user may be able to record/preset different messages depending on the identity of the third party device 550 trying to make contact with the first device 500. For example, if the third party telephones the first device, and is identified (for example, by the calling telephone number) as a family member or a friend, an informal answer machine message may be provided stating "Esa is busy! Leave a message and I'll call you back!". If the third party is identified as a business colleague or an unknown caller, a more formal answer machine message may be provided stating "Esa Nousiainen is currently unavailable, please leave your name and number after the tone." In other examples, if the caller is identified as a contact who the user of the first device would want to speak to immediately, the call may be put through to the device and an automatic availability status update message 560, 570 may not be sent to the caller.

While FIGS. 5a-5b show a first device 500 on the charging plate 520, it is possible for other devices to also be placed on the charging plate for battery recharging. For example, a user may be able to place a smartphone and a tablet computer on the charging plate. Both the smartphone and tablet computer may be configured to provide availability status updates according to examples disclosed herein. In this example, the apparatus configured to provide the availability status updates may be the charging plate, a module for the charging plate, or a remote element in contact with the smartphone and tablet computer, for example.

Figure 6A:
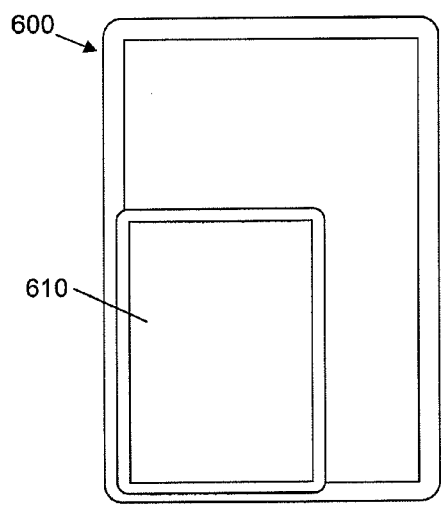
FIGS. 6a-6d illustrate examples of a first portable electronic device and a second electronic apparatus/devices in proximity, and examples of availability status updates provided to a third part device, according to examples disclosed herein.

FIGS. 6a-6d illustrate an example wherein two users have gone out to dinner and they do not want to be disturbed by someone contacting them. The first user, Esa, has a first portable electronic device 600. The second user, Kati Nguyen, has a second apparatus which is a second portable electronic device 610. The devices 600, 610 may be mobile telephones, smartphones, tablet computers, or PDAs, for example. As shown in FIG. 6a, the users decide to place their respective devices 600, 610 within a predetermined proximity (which in this example is one device placed on top of the other). The determined relative position of the first device 600 with respect to the second device 610 automatically provides for an availability status update to be provided to a third party device. In this example the automatic status update is associated with Esa, the user of the first device 600, and in other examples may be associated with Kati, the user of the second device 610, or with the users of both devices 600, 610.

In this example, an availability status update is provided by switching on an answer machine message to a person who tries to call the first device 600. Also, an availability status update is provided by text message to a person who sends a text message to the first device 600. In addition, a social media status update is posted on the first user's social media page for any of her social media contacts to view. These aspects were not operational before the predetermined proximity was determined.

Figure 6B:
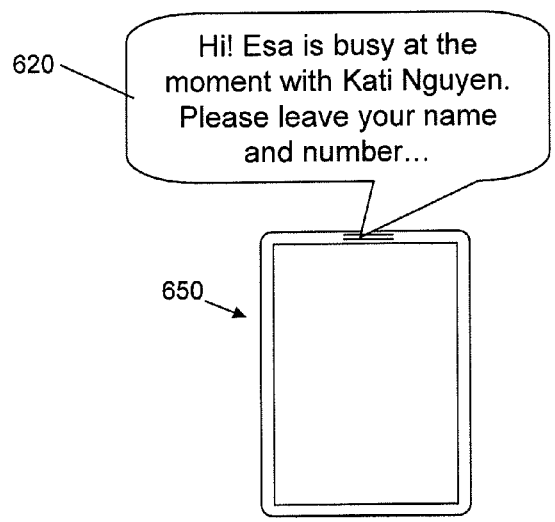

FIG. 6b illustrates a third party device 650 making a telephone call to the first device 600. The first device 600 is configured, due to the determined proximal position with the second device 610, to respond to a received telephone call by playing an answer machine message 620 to the third party caller. In this example the answer machine message 620 reads "Hi! Esa is busy at the moment with Kati Nguyen. Please leave your name and number after the tone and Esa will call you back—thanks". The apparatus is configured in this example to determine particular details associated with the second user, which in this example is the second user's name, Kati. The second user's name, Kati Nguyen, is recited in the answer machine message so that the third party caller is told who the person they are trying to call is with.

In some examples, the name "Kati Nguyen" may be pre-recorded by the first device user and stored in association with a contact entry or profile of the second user on the first device or accessible buy the first device (for example, on a remote server). In other examples, the name "Kati Nguyen" may be pre-recorded by the second user and stored on the second device 610 or remotely, for use by another device such as the first device 600 for personalised answer machine messages 620. Thus, due to the determined proximal position of the first and second devices 600, 610 with respect to each other, the devices 600, 610 may exchange information such as pre-recorded names for use in answer machine messages sent by the first and/or second devices 600, 610.

Figure 6C:
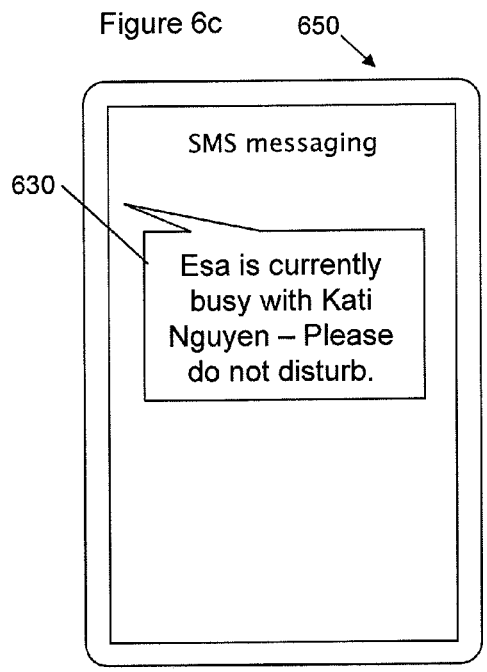

FIG. 6c illustrates a third party device 650 which has sent an SMS text message to the first device 600. The first device 600 is configured, due to the determined proximal position with the second device 610, to respond to a received text message by sending an automatic text message response 630 to the third party device 650. In this example the text message 630 reads "Esa is currently busy with Kati Nguyen—Please do not disturb".

Because the apparatus is configured in these examples to determine particular details associated with the second user, the second user's name, Kati Nguyen, is given in the text message response 630 so that the third party is told who the person they are trying to contact by text message is with. Since the message 630 asks not to be disturbed, the third party will know not to try and contact Kati Nguyen as she is busy with Esa.

If more than two parties are together and do not want to be disturbed, they may be able to, for example, place their respective personal devices in a pile so that each device can communicate with the others. For example, in a meeting of five colleagues, each colleague may each place his/her smartphone in a pile (in overlying proximity to the other devices). A third party trying to contact one of the colleagues (called Bob) would receive a message stating, for example "Bob is in a meeting with Fred, Jane, Jim and Sandy and will get in touch later". The third party then knows not to try and contact any of those five people as they are all busy in the meeting. Of course, the message may just say "Bob is in a meeting", or give a busy/engaged tone.

Figure 6D:
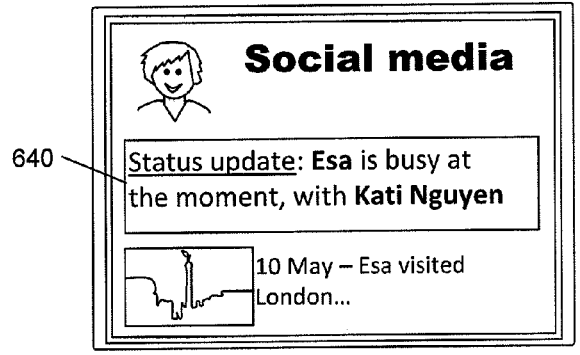

FIG. 6d illustrates a third party device 650 which is currently displaying a social media homepage of a user of the third device 650. In this example, the automatically provided availability status update is not provided to a particular third party trying to make contact with the user of the first device (although it would be viewable by a third party who has access to the social media homepage). The automatically provided availability status update 640 is posted on the social media page of the first user for any social media contact to see and is provided as shown as an update 640 on the home page of a social media contact linked to the first user. The automatic availability status update 640 is this example is a status update 640 stating "Esa is busy at the moment, with Kati Nguyen". The social media page in this example may be considered to be available to a third party and any contact viewing the social media page may be considered to do so using a third party electronic device.

In certain examples above the apparatus is configured to receive details (i.e., a name) of a user of the second electronic apparatus 610 and provide those details in the availability status update 620, 630, 640 for the user of the first portable electronic device 600. It may be said that the apparatus is configured to receive details (i.e., a name) of a user of the second electronic apparatus 610 and provide those details in the availability status update 620, 630, 640 on behalf of the user of the second electronic apparatus. Thus because the third party device 650 trying to make contact with the user of the first device 600 receives information about the user of the second apparatus 610 which is proximal to the first device 600, the third party device 650 receives information on behalf of the user of the second device 610 and knows that he/she is unavailable with the first device user.

In certain examples, the apparatus may be able to determine that the user of the first device and the user of a second apparatus/device belong to the same group. As an example, if there are several users, respectively of the first device and a plurality of second devices, and they are all determined to be family members, then the social media page for that group (family) may be updated with an availability status update to show that there is a family gathering taking place. The group social media page would indicate that it is unlikely that members of the family are contactable. As another example, if two users are determined to have respective accounts with the same social media provider, then availability status updates could be provided on their respective social media pages. If both users are determined to be business colleagues, availability status updates could be transmitted to third parties who are also determined to be business colleagues. In other examples, if both users are determined to belong to a particular group, other third parties also in that same group may receive one type of availability status update while other third parties not in that group may receive a different type of availability status update.

In certain examples, availability status updates may be provided via communications means/apparatus which are common to the users of the first and second devices and not via communications means/apparatus which are not common among the first and second users. For example, if the user of the first device has social media accounts with social media organisations A, B and C, and the user of the second apparatus/device has social media accounts with social media organisations B, C and D, then availability status updates may be posted to the user's respective social media pages for social media types B and C only as these are the common social media types among the two users.

FIGS. 7a-7d illustrate examples wherein the first portable electronic device 700, 750 and the second apparatus/device 710, 760 are portable electronic devices. The first device 700, 750 belongs to Alice and the second apparatus/device 710, 760 belongs to Bob. Depending on the relative orientation of the first device 700, 750 with respect to the second device 710, 760, different availability status updates may be provided to a third party device. That is, the apparatus (which may be the first or second device, a module for the same, or a remote apparatus) is configured to provide a particular availability status update based on the relative positional proximity of the first portable electronic device 700, 750 and the second electronic apparatus/device 710, 760.

The relative proximity of the first and second devices 700, 710, 750, 760 may be determined by a proximity sensor, for example. Information such as the name of the owner of each device (Alice, Bob) can be communicated between the two devices, for example via Bluetooth or near field communication (NFC), for example.

The examples of FIGS. 7a and 7b illustrate that by changing the relative positioning of the two devices with respect to each other, the types of availability status update provided to a third party may be easily changed. The examples of FIGS. 7c and 7d show that by changing the relative positioning of the two devices with respect to each other, the information provided in an availability status update can be changed. Overall, the examples of FIGS. 7a-7d illustrate that the level of information provided in an availability status update, and the types of availability status update provided, can be changed depending on the relative positioning of the two devices.

In FIG. 7a the first and second devices 700, 710 are positioned relative to each other such that the front faces 704, 714 (the faces comprising a display screen) are facing each other and the back faces 702, 712 are facing away from each other. Each device 700, 710 is configured, due to the proximity of the devices to each other, to send an availability status update in response to an incoming air interface communication (inn this example, an SMS text message) and automatically reply. Therefore Alice's device 700 will automatically send an SMS text message reply to a received SMS text message stating "I'm currently busy with Bob—I'll text you later" and Bob's device 710 will automatically send an SMS text message reply to a received SMS text message stating "I'm busy with Alice at the moment—I'll get in touch later".

Further, in this particular configuration even if no third party tries to contact Alice via her device 700, the device 700 will provide an availability status update in a social media posting. Thus in this relative configuration, the first device 700 is configured to provide an availability status update by posting a social media status update to the user's social media homepage stating "Alice is currently busy with Bob", and post a microblog entry stating "Alice is currently busy with Bob" available to any microblog followers/third parties.

In this way Alice knows that anyone reading her social media page or microblog can see they she currently busy and with whom. Also Alice and Bob both know that a third party who sends an SMS text message to their respective devices 700, 710 will receive an automatic SMS text reply to say why he/she can't reply at the moment.

In FIG. 7b the first and second devices 700, 710 are positioned relative to each other such that the front face 704 of the first device 700 faces the back face 712 of the second apparatus/device 710, and the back face 702 of the first device 700 and front face 714 of the second device 710 face away from each other. In this particular configuration, the first device 700 will send an availability status update in response to an incoming air interface communication but will not post a social media status update/message. Thus in this relative configuration, the first device 700 is configured to provide an availability status update for incoming air interface communication to the first device 700 prior to the provision of the availability status update for the source of the incoming air interface communication. Bob's device 710 is configured not to provide availability status updates in this example, but of course in other examples it may do.

An incoming air interface communication may be an SMS, MMS, e-mail or chat message, or incoming telephone or video call, for example. That is, if a third party device calls the first device 700, the first device 700 is configured to automatically provide an answer machine message reciting, for example, "Alice is busy at the moment, please leave a message". In some examples, the message may recite details of the person Alice is with, such as, for example, "Alice is busy with Bob at the moment, please leave a message . . . ". Also, if a third party sends an SMS text message to the first device 700, an automatic SMS text message reply may be sent from the first device 700 to the third party device stating, for example, "Alice is with Bob at the moment, she'll get back to you later". If a third party sends an e-mail to the first device 700, an automatic reply message may be sent such as "Alice is currently in a meeting with Bob, and will reply to your e-mail later today".

In certain examples, a particular defined availability status update may be provided according to the particular source of the incoming air interface communication. For example, if the source of the incoming air interface communication is associated with a telephone number which is recorded in the first device as a known contact such as a family member or friend, a less formal automatic reply (for example, "Alice is busy and will get back to you later!") may be provided. If the source of the incoming air interface communication is associated with a telephone number which is not a known contact, or associated with a known contact which is recorded as a business or service number, such as a doctor's surgery or a solicitor, a more formal automatic reply may be provided (for example, "Alice is currently engaged and will contact you later, please leave your name and number. Thank you").

In FIG. 7c the first and second devices 750, 760 are positioned relative to each other such that they are side by side within a predetermined proximity 755. In this configuration the first and second devices 750, 760 are both configured to post a social media message to the respective page of the user of each device stating "Out with Alice" (on Bob's social media page) and "Out with Bob" (on Alice's social media page). In certain examples, other information relating to the particular circumstances may also be provided. For example, if at least one of the devices 750, 760 is equipped with location determination capability such as GPS, the current location of the user's devices may also/alternatively be provided in an availability status update, for example in an automatic text message reply reciting "Alice is out with Bob at Mario's Restaurant". The availability status update may, of course, just provide an indication of the location of the first device.

In this example any incoming air interface communications, such as telephone/video calls and e-mail/SMS messages do not cause an automatic response to be transmitted to the third party sender but the first and second devices 750, 760 are, due to the determined proximity, automatically placed into a "silent" mode wherein, for example, no sound alerts (ringtones, beeps) are played and no visual alerts (such as illumination of the screen upon receipt of a message) are provided. In this example the first and second devices 750, 760 are configured such that the users of the devices will not be distracted by incoming messages and friends/contacts linked to the users via social media can see why the users are currently engaged.

In FIG. 7d the first and second devices 750, 760 are positioned relative to each other such that they are side by side within a predetermined proximity 765, similarly to the configuration shown in FIG. 7c, except here a short edge of the first device 750 is proximal to a long edge of the second device 760. In this configuration the first and second devices 750, 760 are both configured to post a social media message to the respective page of the user of each device but the message will not state who the user is with. For example, a message reciting "I'm out at the moment" may be posted on both Alice and Bob's respective social media pages. The examples of FIGS. 7c and 7d show that by changing the relative positioning of the two devices with respect to each other, the information provided in an availability status update can be easily changed.

The examples of FIGS. 7a-7d illustrate different example combinations of availability status update which may be provided by one or more devices. It will be appreciated that any combination of such examples may be provided, and a device may be configured by a user, for example in a user preferences menu, to provide availability status updates according to the user's preferences (for example relating to what different relative positions with respect to another device or devices may be used and what availability status updates are therefore provided).

Figure 8A:
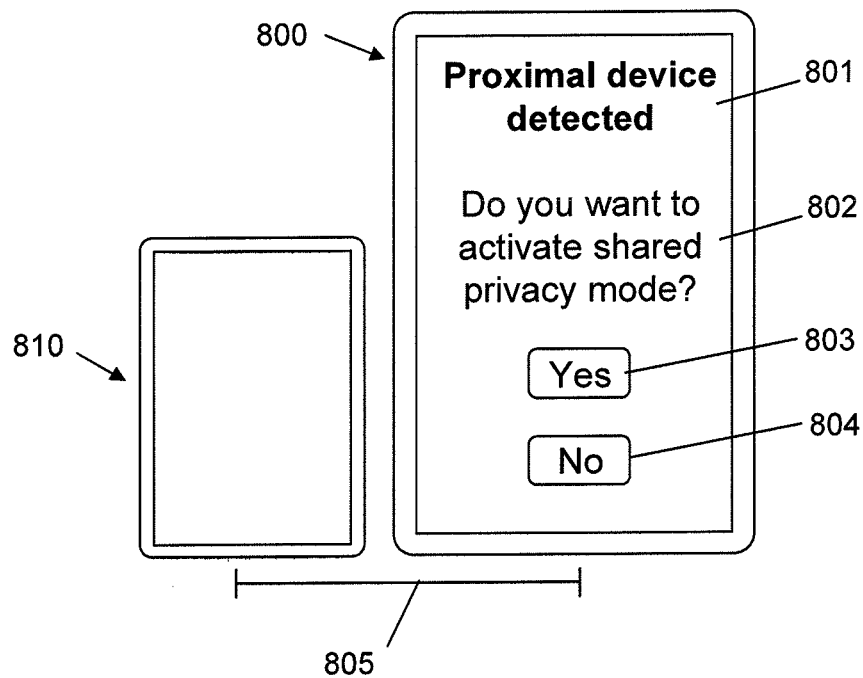
FIGS. 8a-8b illustrate examples of a first portable electronic device and a second electronic apparatus/device in proximity showing a user prompt to allow for availability status updates according to examples disclosed herein.
Figure 8B:
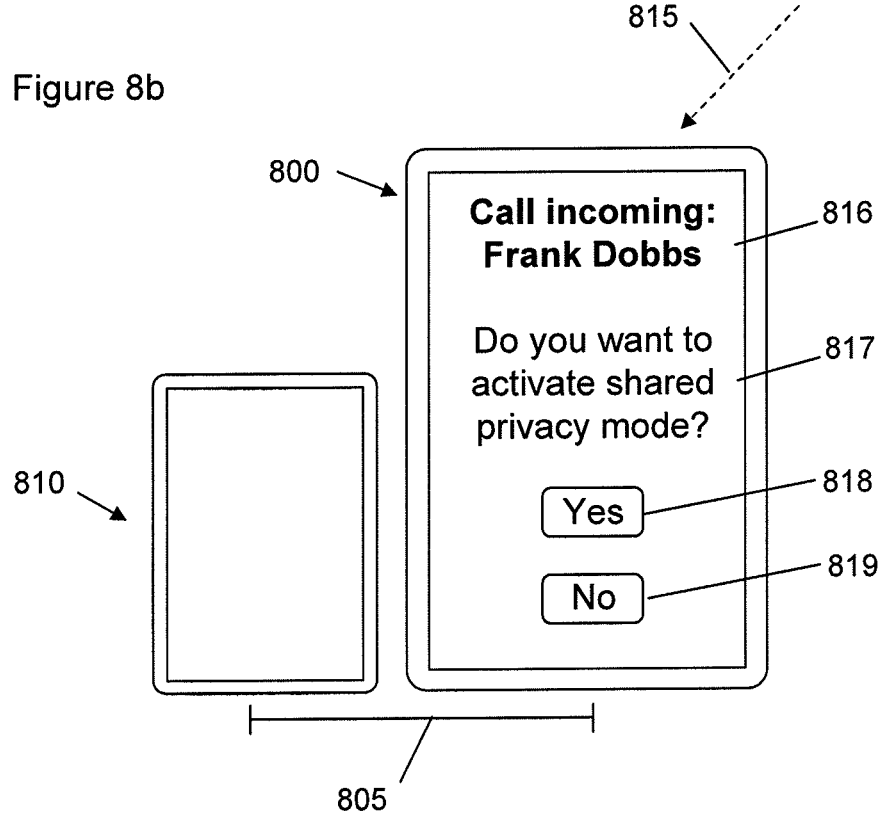

In certain examples the provision of availability status updates can occur upon determination of a proximal device or devices without further input being required from the user. FIGS. 8a and 8b illustrate that the automatic provision for an availability status update for use by a third party electronic device may be provided both upon detection of at least a second electronic apparatus within a predetermined proximity with respect to the first device, and upon user confirmation to provide availability status updates. In these examples, the provision of availability status updates is performed by the device 800 operating in a "busy mode", which may be called a "shared privacy mode" as indicated in the figures, a "functional privacy mode" or a "do-not-disturb mode", for example.

FIGS. 8a and 8b show a first device 800 and a second device 810 within a predetermined proximity 805 such that the provision of an availability status update may be provided. The apparatus in this example is configured to prompt the user of the first device 800 to initiate the provision of a first portable electronic device mode, "shared privacy mode" in this example, which provides for the provision of the availability status update. In FIG. 8a, the second device 810 is detected as being with the predetermined proximity of the first device 800, and this detection is indicated 801 to the user on the display of the first device 800. Due to the detection, the first device 800 requests user confirmation 802 that availability status updates are to be provided. In this example the user can select "Yes" 803 to cause the device 800 to provide availability status updates to a third party, or "No" 804 to opt not to place the device in a shared privacy mode and therefore not provide availability status updates.

In FIG. 8b, a proximal device 810 is detected but this in itself does not cause a shared privacy mode to be entered. The apparatus is configured such that the automatic provision of the availability status update requires an incoming air interface communication 815 to the first portable electronic device 800 prior to the provision of the availability status update for the source of the incoming air interface communication. An incoming telephone call 815 (an air-interface communication) from Frank Dobbs, a third party, is detected and indicated 816 to the user on the display of the first device 800. Due to the detection of both the proximal device 810 and the incoming telephone call 815, the first device 800 requests user confirmation 817 that availability status updates are to be provided. In this example the user can select "Yes" 818 to cause the device 800 to provide availability status updates to a third party, or "No" 819 to not provide for automatic availability status updates.

In other examples, more user options may be provided. For example, upon detection of a proximal device, the first device may prompt a user to select a particular predefined availability status update message (e.g. formal or informal) or type/types of availability status update to be provides (e.g., social media updates, text message, answer machine message, e-mail response). In certain examples, the user may be prompted to create/write/record an availability status update. For example, upon detecting a proximal device the user may be prompted to record a new answer machine message reciting the name of the person associated with the proximal device so that a personalised answer machine message with the name of the other person may be provided as an availability status update.

In certain examples, when a second device is detected proximal to a first device, the first device may provide user settings relating to information to be provided in an availability status update. For example, a user may be able to select in the settings whether or not to include information (such as a name) associated with the second apparatus/device in an availability status update. The user may be able to select in the settings what information is included in different types of availability status update, such as providing no details associated with the second apparatus/device in an answer machine message or SMS text message reply, but including a user name (or other details/information) associated with the second apparatus/device in a social media status update. Thus the information which is shared in the availability status update (as an answer machine message or status update message, for example) may be defined in the settings.

In the settings, the user may be able to define what information is provided in an availability status update for a particular relative orientation of the first device and second apparatus/device. For example, a user may define that social media sites A and B, but not social media sites C or D, are provided with an availability status update if the first and second devices are oriented face to face. As another example, a user may define that social media sites A and B are provided with details associated with the second apparatus/device in an availability status update, but social media sites C and D are provided with an availability status update without details associated with the second apparatus/device, and social media site E is not provided with an availability status update at all, if the first and second devices are oriented such that the front face of one apparatus/device is next to the back of the other apparatus/device.

The above examples illustrate the provision of availability status updates due to the determined proximity of a second device or devices. The relative position of the first device and second apparatus/devices may be detected as no longer within the predetermined proximity (for example, the meeting between two users ends and each user picks up their respective devices and travels back to their office). In certain examples, the apparatus may be configured to automatically provide for termination of the provision of the availability status update. That is, based on the determination that there is no longer a proximal device, no further availability status updates will be provided until another device is determined to be proximal to the first device. In other examples, the apparatus may be configured to provide a further availability status update indicating the availability of the user of the first portable electronic device. That is, upon the determination that there is no longer a proximal device, an availability status update may be provided. For example, a social media post saying "I'm available now", or a text message stating "Thanks for your earlier text message—I'm free now" may be automatically sent to third party devices which sent a text message to the first device during the period of unavailability of the first device, so that the third party devices are aware that the first device may now be contactable.

In certain examples, the first device may be configured to provide a predetermined number of availability status updates for a third party device in particular group (such as family members or friends) before allowing the third party communications from that third party device to be alerted to the user of the first device. For example, the first device may be configured to respond to any third party incoming telephone call by causing an engaged tone to be heard by the third party. However, a family member may need to get in touch with the user of the first device, for example if an emergency has occurred at home. If it is determined that a predetermined number of telephone calls (for example, three) have been made by the same third party caller in the particular group of family members, the fourth call from that family member third party device would no longer receive an engaged tone, but would cause the first device to ring and alert the user of the first device that the third party really needs to speak to the user.

As another example, the first device may be proximal to a second device such that it provides availability status updates to a third party, and so the user of the first device is not distracted by incoming messages/calls. Previously, the user of the first device has provided certain third party contacts (such as a husband or wife) who he/she does not mind being contacted by with a codeword. In this example, a third party tries to contact the user of the first device and receives an availability status update. The third party decides that they really do need to contact the user of the first device, and so uses his/her codeword as the first word of a text message to be transmitted to the first device. The apparatus can detect the use of the codeword as the first word in the text message and allow the text message to be alerted to the user of the first device, so that the user is made aware that the particular third party needs to contact them. Such examples illustrate that important communications may be received by the user of the first device while non-important communications can continue to receive an availability status update in response.

In certain examples, the apparatus may be configured to, based on a determined proximity between a first portable electronic device and a second electronic apparatus, place the first portable electronic device and/or the second electronic apparatus into a functional privacy mode. The functional privacy mode may be configured by the user in some examples. The functional privacy mode may, for example: mute audio output; provide haptic feedback if a message is received or if another event occurs (for example, the battery is detected to have low power, or a software update is available); automatically respond to a text/e-mail/chat/other message with a message reciting "I'm busy—try me later" or similar, and activate the telephone/video call answer machine. In other examples the functional privacy mode may configure particular settings to provide availability status updates with the first device.

In certain examples, automatically providing for an availability status update may be considered to comprise providing for generation of signalling for transmission to the third party electronic device with availability status details of the user of the first portable electronic device. For example, the apparatus may be considered to generate signalling for the third party device, the signalling containing the availability status update. In certain examples, automatically providing for an availability status update may be considered to comprise providing for transmission of generated signalling for use by the third party electronic device with availability status details of the user of the first portable electronic device. For example, the apparatus may be considered to transmit signalling for use by the third party device, the signalling containing the availability status update.

FIG. 9a shows an example of two apparatus 900, 902 in communication with a remote server. FIG. 9b shows an example of two apparatus 900, 902 in communication with a "cloud" for cloud computing. In FIGS. 9a and 9b, apparatus 900, 902 (which may be apparatus 100, 200 or 300) may also be in communication with each other. The apparatus 900 and further apparatus 902 may, for example, by devices such as portable electronic devices. Communication may be via a communications unit, for example.

FIG. 9a shows the remote computing element to be a remote server 904, with which the apparatus 900, 902 may be in wired or wireless communication (e.g. via the internet, Bluetooth, NFC, a USB connection, or any other suitable connection as known to one skilled in the art). In FIG. 9b, the apparatus 900, 902 are in communication with a remote cloud 910 (which may, for example, be the Internet, or a system of remote computers configured for cloud computing). For example, the apparatus providing the availability status updates may be located at a remote server 904 or cloud 910 and accessible by the first and/or a second device/devices 900, 902.

Recorded answer machine messages and pre-composed text message and e-mail availability status updates may be stored remotely at a server 904 or cloud 910. Communication of information relating to one apparatus/device 900, 902 to be transferred to the other apparatus/device 900, 902 may be directly between the two apparatus/devices 900, 902, or may be via the remote server 904 or cloud 910.

FIG. 10 illustrates a method according to an example embodiment of the present disclosure. The method comprises the step of automatically providing for an availability status update associated with a user of a first portable electronic device, for use by a third party electronic device, when the determined relative position of the first portable electronic device with respect to at least a second electronic apparatus is within a predetermined proximity 1000.

FIG. 11 illustrates schematically a computer/processor readable medium 1100 providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   when the determined relative position of a first portable electronic device with respect to at least a second electronic apparatus is within a predetermined proximity, automatically provide for an availability status update, associated with a user of the first portable electronic device, for use by a third party electronic device wherein, when the at least a second electronic apparatus is a portable electronic device of a second user, or respective portable electronic devices of respective plurality of users, the availability status update comprises particular details associated with the second user or respective one or more of the plurality of users.

2. The apparatus of claim 1, wherein the predetermined proximity is at least one of an overlying proximity in which at least a portion of the first portable electronic device overlies the second electronic apparatus, and a non-overlying proximity position.

3. The apparatus of claim 1, wherein the second electronic apparatus is one or more of a charging plate for the first portable electronic device and a portable electronic device of a second user.

4. The apparatus of claim 1, wherein the particular details comprise a name associated with the second or one or more of the respective plurality of users.

5. The apparatus of claim 1, wherein the automatically provide for an availability status update comprises providing for generation of signalling for transmission to the third party electronic device with availability status details of the user of the first portable electronic device.

6. The apparatus of claim 1, wherein the automatically provide for an availability status update comprises providing for transmission of generated signalling to the third party electronic device with availability status details of the user of the first portable electronic device.

7. The apparatus of claim 1, wherein, when the relative position is no longer determined to be within the predetermined proximity, automatically provide for one or more of: termination of the provision of the availability status update; and provision of an availability status update indicating the availability of the user of the first portable electronic device.

8. The apparatus of claim 1, wherein the apparatus is configured such that the automatic provision of the availability status update requires, prior to the automatic provision for use by the third party electronic device, one or more of: user confirmation; user selection of a particular predefined availability status update; prompting the user to create/write/record an availability status update; and prompting the user to initiate the provision of a first portable electronic device mode which provides for the provision of the availability status update.

9. The apparatus of claim 1, wherein the apparatus is configured such that the automatic provision of the availability status update requires an incoming air interface communication to the first portable electronic device prior to the provision of the availability status update for the source of the incoming air interface communication.

10. The apparatus of claim 9, wherein the apparatus is configured to provide a particular defined availability status update according to the particular source of the incoming air interface communication.

11. The apparatus of claim 1, wherein the availability status update comprises one or more of: an unavailable and/or engaged dialing tone associated with the first portable electronic device; an unavailable and/or engaged message indication associated with the user of the first portable electronic device; signalling to activate an answerphone associated with the user of the first portable electronic device; an answerphone message associated with the user of the first portable electronic device; and a posting for a social media application associated with the user of the first portable electronic device.

12. The apparatus of claim 1, wherein the apparatus is configured to receive details of a user of the second electronic apparatus and provide those details in the availability status update for the user of the first portable electronic device.

13. The apparatus of claim 1, wherein the apparatus is configured to receive details of a user of the second electronic apparatus and provide those details in the availability status update on behalf of the user of the second electronic apparatus.

14. The apparatus of claim 1, wherein the apparatus is configured to provide for the availability status update based on whether the at least a second electronic apparatus is within a predefined group for the user of the first portable electronic device.

15. The apparatus of claim 1, wherein the apparatus is configured to provide a particular availability status update based on one or more of the particular determined proximity and relative positional proximity of the first portable electronic device and the second electronic apparatus.

16. The apparatus of claim 1, wherein the availability status update is configured for use by a social media application available to the third party electronic device.

17. The apparatus of claim 1, wherein the apparatus is configured to automatically enter the first portable electronic device into a busy mode when the determined relative position is within the predetermined proximity position, the busy mode providing for the availability status update.

18. A computer readable medium comprising computer program code stored thereon, the computer readable medium and computer program code being configured to, when run on at least one processor perform at least the following: when the determined relative position of a first portable electronic device with respect to at least a second electronic apparatus is within a predetermined proximity, automatically provide for an availability status update, associated with a user of the first portable electronic device, for use by a third party electronic device wherein, when the at least a second electronic apparatus is a portable electronic device of a second user, or respective portable electronic devices of respective plurality of users, the availability status update comprises particular details associated with the second user or respective one or more of the plurality of users.

19. A method comprising: automatically providing for an availability status update associated with a user of a first portable electronic device, for use by a third party electronic device, when the determined relative position of the first portable electronic device with respect to at least a second electronic apparatus is within a predetermined proximity wherein, when the at least a second electronic apparatus is a portable electronic device of a second user, or respective portable electronic devices of respective plurality of users, the availability status update comprises particular details associated with the second user or respective one or more of the plurality of users.

* * * * *